(12) United States Patent
Avinash

(10) Patent No.: US 6,782,137 B1
(45) Date of Patent: Aug. 24, 2004

(54) DIGITAL IMAGE DISPLAY IMPROVEMENT SYSTEM AND METHOD

(75) Inventor: Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/448,706

(22) Filed: Nov. 24, 1999

(51) Int. Cl.$^7$ .............................. G06K 9/40; G09G 5/00
(52) U.S. Cl. ...................... 382/254; 382/298; 345/617
(58) Field of Search ............................ 382/131–132, 382/168, 266, 274, 298, 254, 300, 169, 173, 260–264; 345/660, 611, 617, 670, 671

(56) References Cited

U.S. PATENT DOCUMENTS

| | | | | |
|---|---|---|---|---|
| 3,979,555 A | * | 9/1976 | Opittek et al. ............... | 348/672 |
| 4,947,416 A | * | 8/1990 | McFaul et al. ............. | 378/146 |
| 5,063,607 A | * | 11/1991 | FitzHenry et al. .......... | 382/274 |
| 5,357,549 A | * | 10/1994 | Maack et al. ................ | 378/62 |
| 5,467,404 A | * | 11/1995 | Vuylsteke et al. .......... | 382/274 |
| 5,640,469 A | * | 6/1997 | Lewins et al. .............. | 382/274 |
| 5,835,618 A | * | 11/1998 | Fang et al. .................. | 382/132 |
| 5,943,433 A | | 8/1999 | Avinash ...................... | 382/131 |
| 5,949,918 A | * | 9/1999 | McCaffrey .................. | 382/274 |
| 5,963,676 A | * | 10/1999 | Wu et al. .................... | 382/274 |
| 6,424,730 B1 | * | 7/2002 | Wang et al. ................. | 382/128 |

OTHER PUBLICATIONS

"Adaptive Image Contrast enhancement based on Human Visual Properties"; T.–L. Ji, M.K. Sundareshan, and H. Roehrig; EEE Transactions on Medical Imaging, vol. 13, No. 4., Dec. 1994.

* cited by examiner

Primary Examiner—Kanji Patel
(74) Attorney, Agent, or Firm—Fletcher Yoder

(57) ABSTRACT

A technique is disclosed for enhancing discrete pixel images in accordance with a desired dynamic range, such as the dynamic range of a softcopy display. Adaptive equalization is first performed on the image data to reduce overall differences between high and low intensity values, while maintaining the overall appearance of light and dark regions of the reconstructed image. Adaptive contrast boosting or enhancement is then performed on the equalized values to bring out details visible by virtue of the enhanced local contrast. The contrast enhancement may include non-linear mapping of a mid-frequency boosted image onto the dynamic range of the softcopy display.

26 Claims, 7 Drawing Sheets

DIGITAL IMAGE DISPLAY IMPROVEMENT SYSTEM AND METHOD

FIELD OF THE INVENTION

The present invention relates generally to the field of digital image processing, and more particularly to a technique for enhancing the appearance of digital images, such as medical diagnostic images, to more clearly render certain image features while maintaining overall image intensity levels. The invention also provided a system and method for enhancing medical diagnostic images, particularly computed radiology and digital x-ray images.

BACKGROUND OF THE INVENTION

Digital imaging systems have become increasingly useful in a variety of fields, particularly in medical diagnostic imaging. In systems of this type, image data is generated that defines characteristics of discrete picture elements or pixels of an image matrix. The matrix of pixels, when viewed by the observer, forms an overall reconstructed image in which features of interest are visible to the observer. In general, the characteristics of the pixels that form the image may be intensity (i.e. gray level), color and the like. In medical diagnostic imaging, for example, discrete pixel images are acquired, processed, and displayed typically by varying the intensity of the pixels making up the image matrix to simulate conventional photographic images, or to render images which would have been difficult or impossible to obtain through conventional means.

Digital imaging systems have been configured to process image data in various manners, depending upon the source of the data, the type of data, and the display technique to be employed. For example, in the medical diagnostics field, image data may be acquired through various modality systems, including magnetic resonance imaging (MRI) systems, computed tomography (CT) systems, x-ray systems, ultrasound systems, and so forth. Depending upon the imaging modality, the image data may be further processed, filtered, enhanced, scaled, and so forth to reduce noise and to render more visible particular features of interest. The resulting image may be viewed by a user, such as on a computer monitor or similar display, often referred to as softcopy, or may be output as hard copy, such as on a paper or similar support, or photographic film.

With the advent of softcopy displays, problems have presented themselves which did not occur, or were less pronounced with conventional technologies. For example, in x-ray images rendered on photographic film, a light box was typically used by radiologists to read the resulting images, with excellent contrast and detail being provided by the photographic film. Where softcopy is desired, however, the same features may be less visible due to the limited dynamic range of the display device, or to the inherent limitations in rendering the detail in a manner that enables features of interest to be distinguished comparably to photographic film. This problem is particularly acute in view of the fact that softcopy displays are increasingly popular due to the archiving of large volumes of images in institutions, and to the facility of accessing the images for display at workstations where the radiologist will page through a large number of examinations during a reading session.

In the case of x-ray images obtained from computed radiography (CR) or digital detectors, a high dynamic range is often present in the image due to the inhomogeneity in the attenuation of various materials in the path of radiation used to generate the image data. The image dynamic range is typically larger than the dynamic range of a softcopy display device. This mismatch in dynamic ranges is further exacerbated by the inherent contrast lost due to multiple wavelengths of the x-ray source. Moreover, some x-ray photons will traverse the subject directly, while other photons will be diverted from their path by intervening material. This phenomenon, often referred to as scatter, can result in additional loss of contrast, particularly when the images are viewed on softcopy displays.

Methods have been proposed for controlling or adjusting dynamic range and contrast enhancement, particularly in CR images. These include multi-resolution algorithms, adaptive histogram equalization methods, multi-channel filtering techniques, local range modification techniques, contrast-limited adaptive histogram equalization techniques, "just noticeable difference" adaptive contrast enhancement techniques, and so forth. While adequate for certain applications and situations, these techniques have not, however, provided a satisfactory overall process for generalized image enhancement, but tend to be extremely specific in nature to a body part or image type.

There is a need, therefore, for an improved image enhancement technique which can be applied to digital image data to improve contrast and feature discernability in images, particularly in the medical diagnostics field. There is a particular need, at present, for a technique which may be applied in a straightforward manner to image data for reconstructed images to be viewed on softcopy displays by compressing a dynamic range, while improving the contrast-to-noise ratio without enhancing image artifacts.

SUMMARY OF THE INVENTION

The present invention provides an image enhancement technique designed to respond to these needs. The invention may be applied in a variety of environments, but is particularly well suited to medical diagnostic imaging, wherein image data is displayed on a softcopy displays such as computer or workstation monitors. The technique offers the advantage of being applicable both to new image viewing systems or stations, as well as to existing systems by loading of image enhancement software for carrying out the functions envisaged.

In a presently preferred embodiment, the technique first performs an adaptive equalization operation, in which pixel values are equalized from original values, while maintaining overall appearance of lighter and darker regions corresponding to higher and lower intensity values. Adaptive local contrast enhancement is then performed based upon the equalized values to render detailed structures more discernable. The contrast enhancement preferably generates a mid-range boosted image, then performs non-linear mapping of the mid-range boosted image onto the dynamic range of the softcopy display device. Several different candidate mapping functions may be available for this purpose, the appropriate function being selected based upon the dynamic range of the display device.

DETAILED DESCRIPTION OF THE INVENTION

Figure 1:
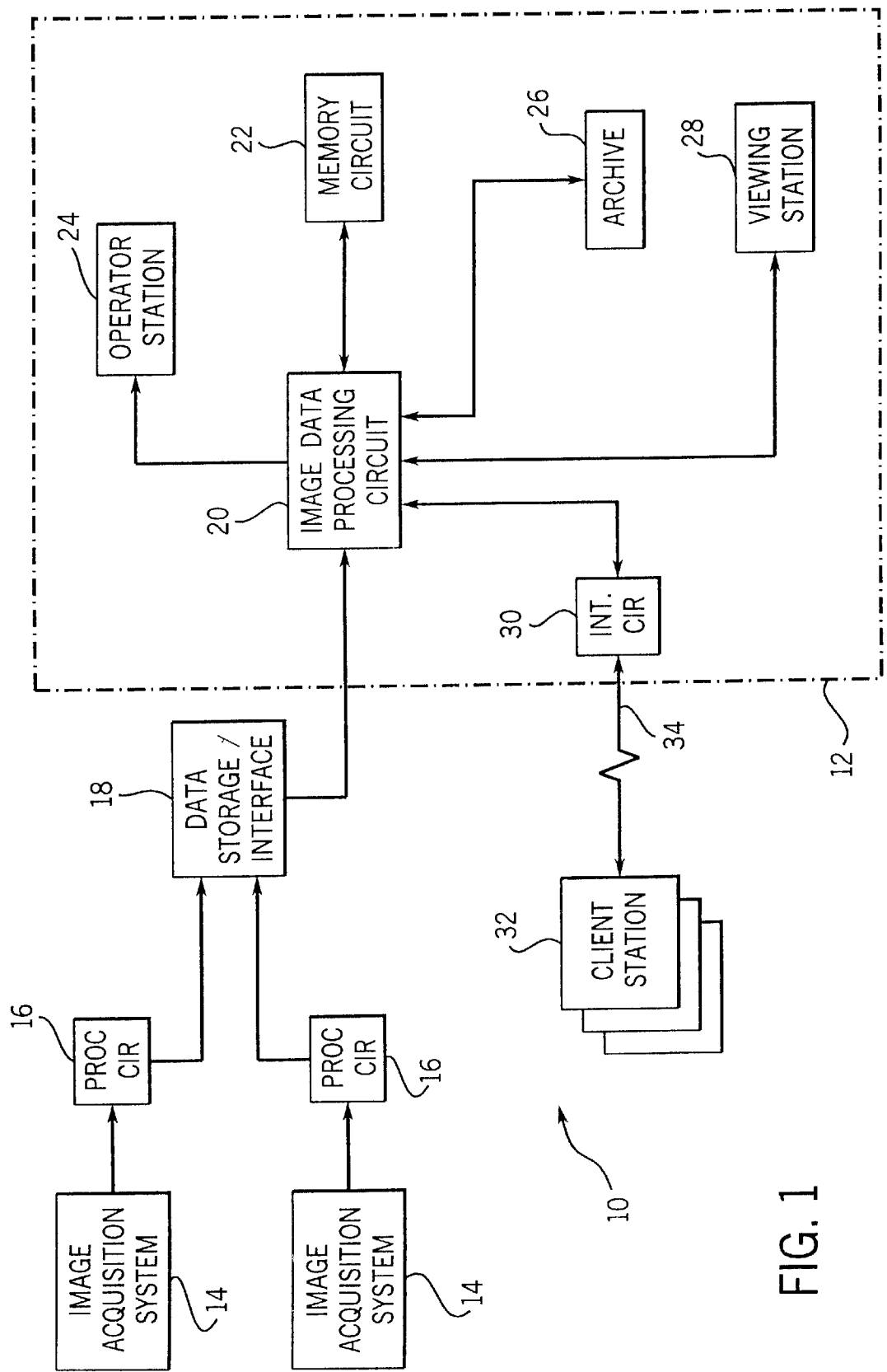
FIG. 1 is a diagrammatical representation of an imaging system for implementing the image enhancement techniques of the present invention.

Referring to the drawings, FIG. 1 represents an imaging system 10 which includes an image processing system 12 for carrying out image management operations, such as the present image enhancement technique on image data generated by one or more image acquisition systems 14. The image acquisition systems may be of any suitable type, and in a medical diagnostic imaging environment, may include various modality acquisition systems, such as MRI systems, CT systems, x-ray systems, ultrasound systems, and so forth. It should be noted, that image acquisition systems 14 may also include digitizing systems, such as equipment designed to convert conventional film-based x-ray images to digital data for processing and storage. Each image acquisition system 14 is coupled to processing circuitry 16 which may perform such operations as filtering, dynamic range adjustment, image enhancement, and so forth. The processing circuitry may be included in the image acquisition system, or may be part of a post-processing system downstream from the acquisition system. Digital image data acquired by the systems 14 and processed by circuitry 16 is applied to a data storage and interface module 18, which similarly may include one or a plurality of components either local to or remote from the image acquisition systems and processing circuitry. In a typical medical diagnostic imaging environment, the data storage and interface system may include local data storage, short term storage systems, archive systems, picture archiving and communications systems (PACS), and so forth. The image data is retrievable from the data storage and interface module 18 for processing and image enhancement in the system 12.

In the diagrammatical representation of FIG. 1, system 12 generally includes an image data processing circuit 20, coupled to a memory circuit 22. The image data processing circuit 20 will typically comprise an appropriate programming code executed by a digital computer based upon the image enhancement technique or routine described below. The programming code may be stored within memory circuit 22, as may certain configuration parameters, image data, and so forth. An operator station 24 is coupled to image data processing circuit 20 for access to parameter configurations, image data, reconstructed images, and the like. Operator station 24 also permits an operator to input parameter configurations for performing the enhancement functions described below. An archive or long term storage memory device 26 is provided for storage of both raw and processed image data. A viewing station 28 coupled to image data processing circuit 20 is provided for viewing reconstructed images based upon the enhanced image data. Viewing station 28 includes a softcopy display, such as a conventional or high intensity computer monitor or a plurality of such monitors. The viewing station may be further coupled to output devices, such as printers, as well as to input devices, such as standard computer keyboards, digitizers, dictation components, and so forth. Finally, image data processing circuit 20 is coupled to an interface circuit 30 which permits processed image data, configuration data, and so forth to be transmitted to a remote location, such as one or more client stations 32 served by the image processing system 12 via network links 34. It should be noted that a plurality of viewing stations may be supported by the system, enabling radiologists and clinicians to access and view reconstructed images. Because dynamic ranges of softcopy display devices in the viewing stations may vary, the present technique enables adaptation of the image enhancement process described below to accommodate such different dynamic ranges.

Figure 2:
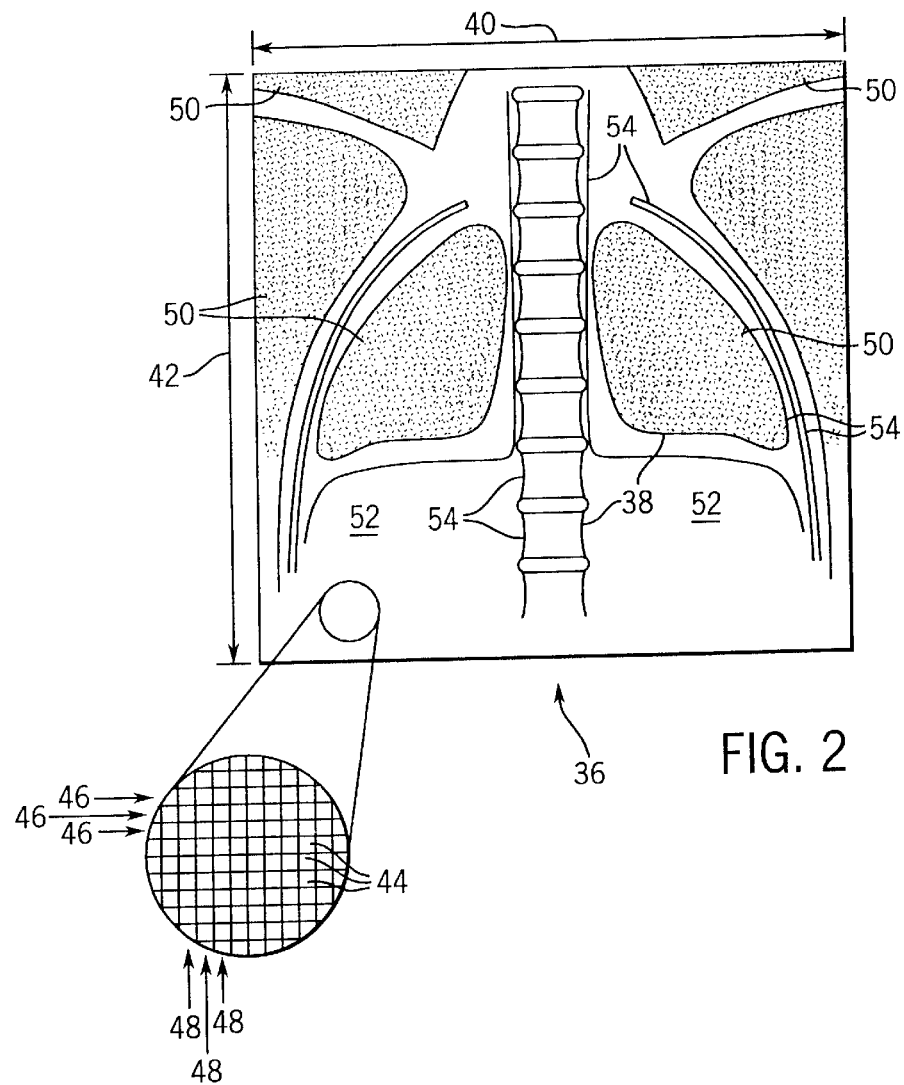
FIG. 2 is a diagram illustrating an exemplary image acquired through the system of FIG. 1 for enhancement in accordance with the present techniques.

Imaging system 10 is designed to acquire data defining individual pixels of an image matrix which, when reconstructed renders a meaningful and useful image as illustrated in FIG. 2. In a typical application, features of interest, such as internal anatomy of a patient, are visible in the reconstructed image by virtue of contrast between the pixels resulting from varying pixel intensities. In the exemplary image of FIG. 2, a chest region is visible in a reconstructed image 36 and includes various features, designated generally by reference numeral 38 in FIG. 2 which are of interest for diagnostic and other purposes. When viewed on a softcopy display, such as a computer monitor, however, certain of these features may be less distinct or distinguishable than would be desired and would be available from more conventional methods, such as photographic film. The present technique provides a mechanism for enhancement of such features, while preserving overall image appearance, as defined by more gradual variations in pixel intensities.

The reconstructed image, as shown in FIG. 2, has a width 40 and a height 42 resulting from juxtaposition of the pixels 44 comprising the matrix. The individual pixels are aligned in rows 46 and columns 48 to form the image matrix. Varying intensity of the pixels within the matrix then produce generally darker regions as indicated at reference numeral 50, and generally lighter regions as indicated at reference numeral 52. The generally darker and lighter regions of the image may be considered to correspond to more gradual or lower frequency changes in the pixel intensity, while more sharp or distinct boundaries, edges, and other local features and details, as indicated at reference numeral 54, are defined by higher frequency or more rapidly changing pixel intensities.

When viewed on a softcopy display, the features of the reconstructed image may be blurred or less distinguishable from surrounding features and regions due to the limited dynamic range of the softcopy display in rendering the image. The present technique is designed to provide for both adaptive equalization of the lighter and darker regions of the image, while enhancing local contrast so as to enable features to be more readily identified and distinguished from the environment.

Figure 3:
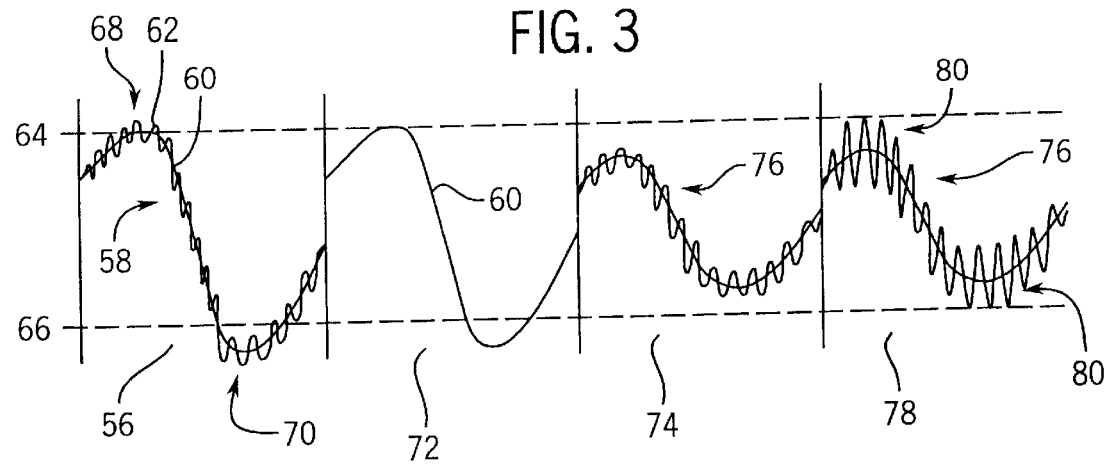
FIG. 3 is a graphical representation of analogous steps in the image enhancement technique of the present invention for performing equalization of overall image features in an adaptive manner to accommodate an effective dynamic range of a softcopy display or similar output, while performing adaptive contrast boosting to enhance feature recognition.

FIG. 3 represents a graphical analogy of the processing steps in the present technique as described more fully below.

As shown in FIG. 3, the technique may be thought of as processing the raw or pre-processed image data from an initial condition as represented in a first envelope 56. The image data, represented analogously as a wave function 58 in envelope 56 of FIG. 3, may be thought of as including a carrier wave 60 representing the gradually changing lighter and darker regions of the reconstructed image, and a higher frequency or detailed wave 62 superimposed on the carrier wave and providing local contrasting detail in the reconstructed image. When compared to the effective dynamic range of the output device, the resulting image data may exceed both upper and lower limits 64 and 66 of the effective dynamic range. As a result, brighter regions, indicated analogously reference numeral 68, may be saturated at an upper limit of the dynamic range, while information within darker regions may be indistinguishable, as represented analogously at reference numeral 70.

Through the present process, adaptive equalization is first performed on the image data to draw the carrier wave 60, as represented individually in envelope 72 of FIG. 3, within the bounds of the dynamic range of the output device. Following such adaptive equalization, as represented at envelope 74 of FIG. 3, the carrier wave will fall within the bounds of the dynamic range, while maintaining the relative light and dark appearances of the corresponding regions of the image. The mid-region of the resulting image data, as represented at reference numeral 76 in FIG. 3, may be preserved, while additional image details available from local contrast or analogously higher frequency image data may be subsequently expanded as indicated at envelope 76 in FIG. 3. This expansion is performed through adaptive contrast boosting to enhance local contrast within brighter and darker regions as indicated at reference numeral 80 in FIG. 3. The resulting image has the appearance of the former image insomuch as the relative brightness and darkness of the more gradually changing pixel intensities is maintained, but includes substantially more contrast for more rapidly changing details to permit these to be distinguished from the surrounding environment.

Figure 4:
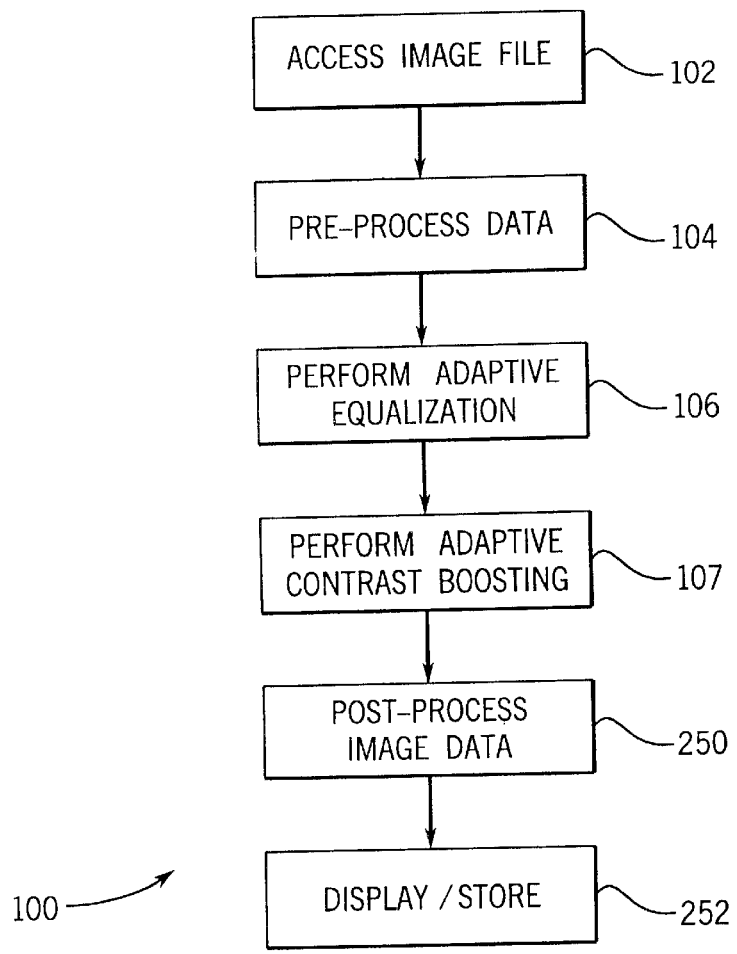
FIG. 4 is a diagram illustrating exemplary control logic for carrying out the present image enhancement technique.

Exemplary control logic for performing the image enhancement functions of the present technique are summarized in FIG. 4. This control logic, designated generally by reference numeral 100, begins with access of the image file, as represented at reference numeral 102. At step 104, the image data may be preprocessed, such as by shrinking the image matrix by a predetermined factor, such as a factor of 2 through neighborhood averaging. As will be appreciated by those skilled in the art, the process of neighborhood averaging consists of averaging the intensities of non-overlapping pixels. For reduction of the image by a factor of 2, then, 2×2 pixel neighborhoods are averaged and the resulting values are inserted into a matrix which will serve as the starting point for the subsequent image enhancement steps. In the presently preferred embodiment, the neighborhood averaging preprocessing operation is performed only if particularly fine structures viewable within the reconstructed image are not of particular interest. The shrinking operation of the preprocessing step, however, where appropriate facilitates and speeds the image enhancement steps described below. When no preprocess shrinking is desired, a parameter value for the preprocess shrinking may be set to a level of unity.

As indicated at reference numeral 106 in FIG. 4, the preprocessing step is followed by adaptive equalization of the image data. As described more fully below, the adaptive equalization process includes shrinking of the image data matrix, smoothing of the image data, equalization of the resulting data, expansion of the data matrix, and construction of an equalized image based upon both the processed image data, and the beginning image data. In general, the adaptive equalization process serves to equalize, but low frequency variations in the image data to correspondingly preserve the appearance of lighter and darker regions in the reconstructed image.

The adaptive equalization process of step 106 is followed by adaptive contrast boosting, as indicated at step 107 in FIG. 4. This process, as described more fully below, serves to avoid unnecessarily high contrast boost at very strong edges and very low contrast areas in a computationally efficient fashion. At the intermediate frequencies contrast is boosted. The contrast boosting process, in the present embodiment, entails shrinking the data matrix, smoothing the image data, generating a gain function, performing spatially independent scaling based upon the gain function, expansion of the data matrix by bilinear interpolation, and unsharp masking of the resulting image data. The unsharp masking step provides a mid-frequency boosted image. A non-linear mapping operation is then performed on the image data to preserve the mid-frequency boosted image data, while translating image data near the upper and lower extremities of the dynamic range to the useful dynamic range of the softcopy display. Finally, the adaptive contrast boosting operations may include a final scaling step to produce the final processed image data.

Following the adaptive contrast boosting, the image data may be post-processed as indicated at step 250. In a present embodiment, such post-processing may include steps such as window leveling, inversion (such as for emulation of conventional x-ray images), bicubic interpolation and so forth. At step 252 the processed image data is called upon to reconstruct the display image, or is stored for later access and image reconstruction, such as for display on a softcopy display of a viewing station.

Figure 5:
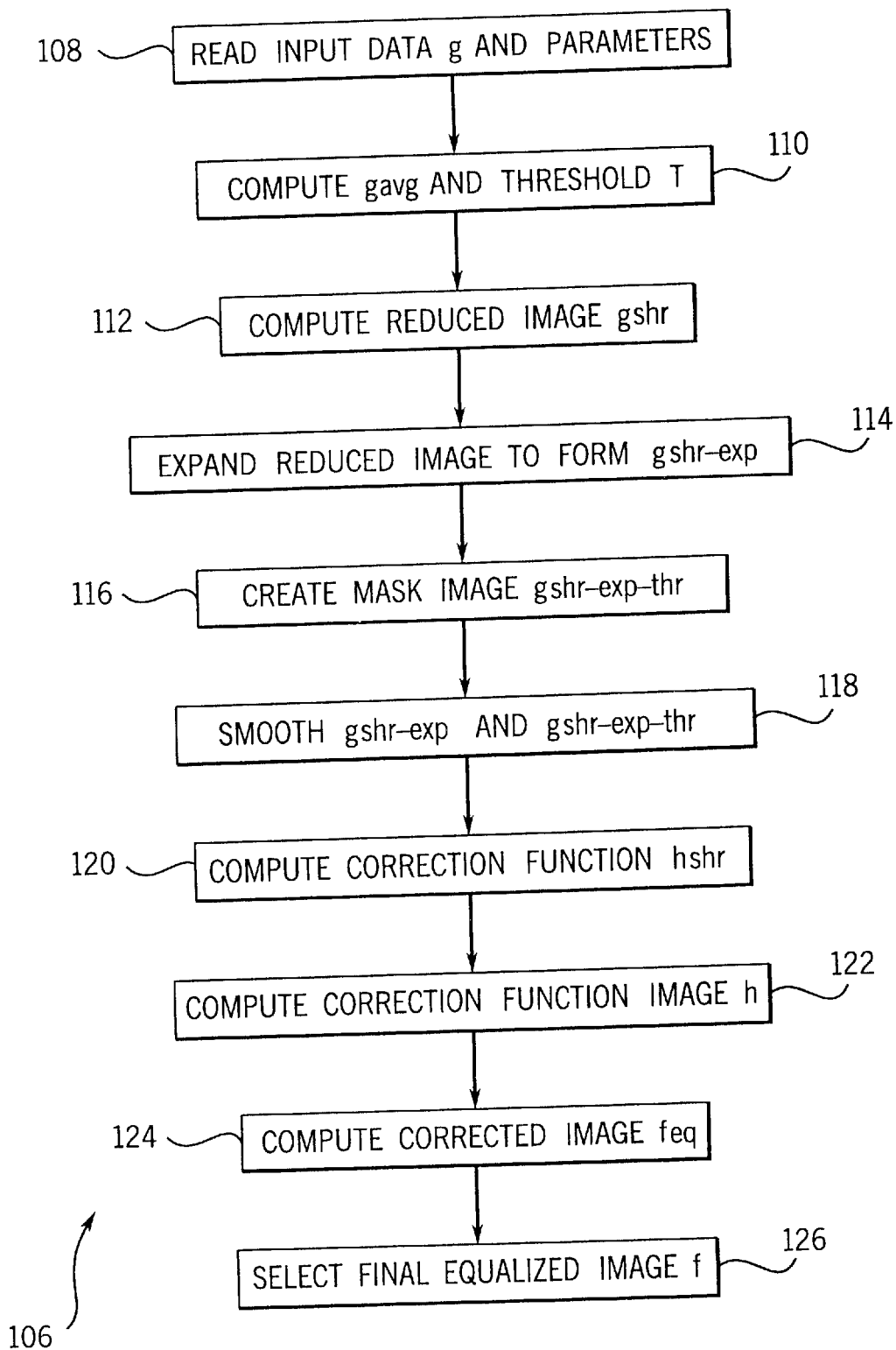
FIG. 5 is a flow chart representing in greater detail exemplary steps in control logic for performing adaptive equalization in the process of FIG. 4.

Exemplary steps in control logic for carrying out the adaptive equalization step 106 of FIG. 4 are summarized in FIG. 5. The adaptive equalization procedure is further illustrated through the diagrammatical representation of FIG. 6. At step 108, the input data for a beginning matrix g and parameters referred to through the following logical steps are first read by the image data processing circuit. The input data defining the matrix g will be determined by the preprocessing step 104 illustrated in FIG. 4, or may be the data directly read from a memory circuit such as memory circuit 22 illustrated in FIG. 1. The parameter values may similarly be stored in the memory circuit, or may be selected by an operator, such as through an operator station 24 or viewing station 28 shown in FIG. 1.

Figure 6:
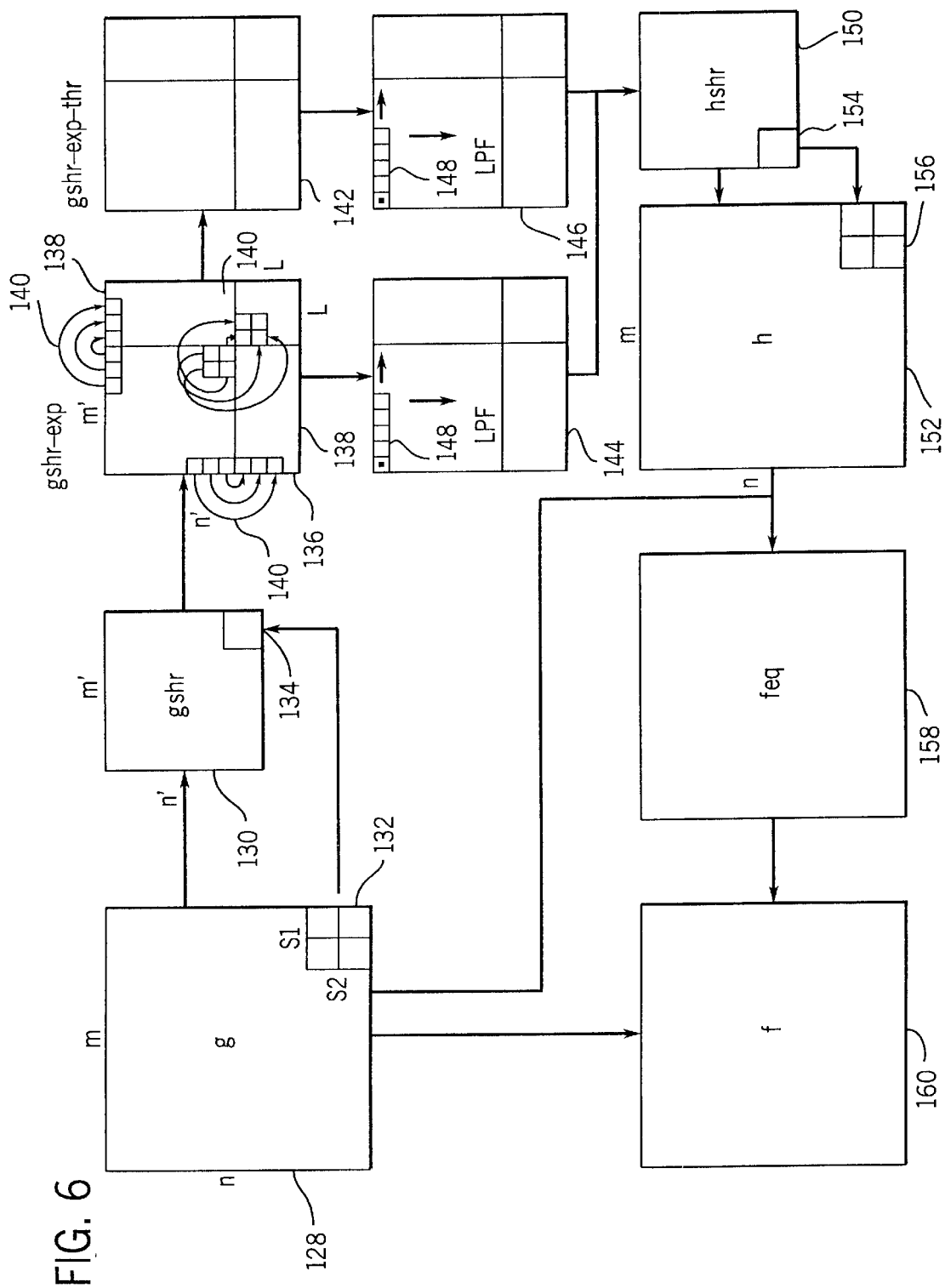
FIG. 6 is a diagrammatical representation of matrix transformations performed in the adaptive equalization steps of FIG. 5.

At step 110, values of $g_{avg}$ and a threshold value T are computed. The value $g_{avg}$ is the average value of the intensities of pixels comprising the matrix g. The threshold value T is set equal to the average value $g_{avg}$ multiplied by a coefficient t, set by the program, or by an operator to a value typically greater than 0, and in the present embodiment to a value of 0.1. At step 112, a reduced image is computed, denoted gshr, by converting the matrix g to the matrix gshr through the application of shrink parameters S1 and S2. Referring to FIG. 6, the original value matrix g, designated by reference numeral 128 in FIG. 6, has dimensions m ×n, and that step 112 is converted to the matrix gshr, having dimensions m'×n', as designated by reference numeral 130. As will be appreciated by those skilled in the art, this operation is performed by averaging non-overlapping pixel neighborhoods of dimensions S1×S2, as indicated at reference numeral 132, to form single pixels 134 in the matrix gshr.

At step 114, the matrix gshr is expanded for later performance of the smoothing operation at step 118. As illustrated diagramatically in FIG. 6, the expansion of matrix gshr is performed by expanding each dimension of the matrix gshr by an input parameter L, which is the dimension of a separable box-car filter. As shown in FIG. 6, the pixel values adjacent to boundaries of the matrix gshr are mirrored into adjacent regions of the expanded matrix gshr-exp as indicated at reference numerals 136 and 138. Thus, as shown at reference numerals 140, pixels adjacent to the edge of the matrix gshr are inserted into locations along the corresponding dimension L of the additional regions 136 and 138. In the presently preferred embodiment, values of input parameter L may be assigned between 3 and 41, although other values may be employed.

At step 116 a threshold mask image gshr-exp-thr is formed. This threshold matrix is formed by application of the following rules:

gshr-exp-thr=C1*$g_{avg}$,
if gshr-exp is>T; and
gshr-exp-thr=0,
if gshr-exp is≦T;

where C1 is a fixed constant set by either the program or by the operator. In a presently preferred embodiment, C1 has a value of 0.01.

Returning to FIG. 5, as indicated at step 118, the matrices gshr-exp and gshr-exp-thr are next smoothed by use of a box-car filter having a length L. As illustrated diagrammatically in FIG. 6, these matrices 138 and 134 are therefore converted to matrices 144 and 146, respectively, by progressive movement of the box-car filter 148 through the expanded matrices. It should be noted that the box-car filter will smooth the image by the neighborhood average first along the rows of the image followed by another neighborhood average along the columns of the image. Computationally, this process is performed by the use of two addition operations and two subtraction operations per pixel, irrespective of the magnitude of the dimension L.

Returning to FIG. 5, at step 120, a correction function hshr is computed by dividing the low pass filtered matrices 144 and 146 created by the smoothing operation of step 118 by one another. Specifically, the matrix 144 which is the low pass filtered matrix of the gshr-exp matrix is divided, within the unexpanded bounds, by the corresponding values of matrix 146, which is the low pass filtered matrix formed from gshr-exp-thr. In this operation, the following rule is applied within the unexpanded coordinates of the pixels:

hshr=max (lpf (gshr-exp), N1)/
max (lpf (gshr-exp-thr), N1);

where max(a, b) is a function which returns the maximum of the values a and b, and N1 is a constant internal parameter such that 0 is less than N1 is less than 1. In a presently preferred embodiment, N1 is set to a value of 0.0001. As illustrated in FIG. 6, this operation renders a matrix of dimensions m'×n', as designated by reference numeral 150.

As noted at step 122 in FIG. 5, a correction function image h, of dimensions m×n, as indicated at reference numeral 152, is next computed by bilinear interpolation of the matrix hshr. As will be appreciated by those skilled in the art, this bilinear interpolation provides for expansion of each pixel 154 of the equalization function into a series of adjacent pixels in a neighborhood 156.

From the correction function image, a corrected image feq is computed as indicated at step 124 of FIG. 5. In this operation, a corrected image is first computed in accordance with the relation:

$f(x, y)=(g(x, y)*h(x, y))/(h(x, y)*h(x, y)+N2)$, where N2 is a parameter entered by the user, typically between 100 and 5,000. It should be noted that the resulting image is a function both of the correction function and of the original matrix g. From the resulting values, the equalized matrix, represented by reference numeral 158 in FIG. 6, is computed in accordance with the relation:

$feq(x, y)=f(x, y)*g_{avg}/f_{avg}$, where the value $f_{avg}$ is the average of the values of f(x, y) computed in the previous step.

To complete the adaptive equalization operation, a final equalized image f is selected as indicated at step 126. In the presently preferred embodiment, a series of logical rules or expressions are applied for selection of individual pixel values either from the matrix feq or from the original matrix g, depending upon relationships therebetween. Specifically, the presently preferred rules are intended to avoid suppression of higher intensity values from the matrix g, while avoiding equalization of low intensity values. Exemplary expressions employed in the presently preferred embodiment may be summarized as follows:

f(x, y)=g(x, y)
if feq(x, y)<g(x, y); OR
f(x, y)=g(x, y)
if feq(x, y)<1; OR
f(x, y)=g(x, y)
if feq(x, y)>g(x, y) AND g(x, y)<T; OR
f(x, y)=g(x, y)
if (maximum pixel intensity in g)*C2>g(x, y); OR
f(x, y)=feq(x, y), where C2 is a predetermined parameter, set to a value of 0.01 in the presently preferred embodiment. As will be noted from the foregoing, and from the diagrammatical representation of FIG. 6, the matrix f designed by the reference numeral 160, is formed by selection in accordance with these criteria from the matrix feq and the original data matrix g.

Figure 7:
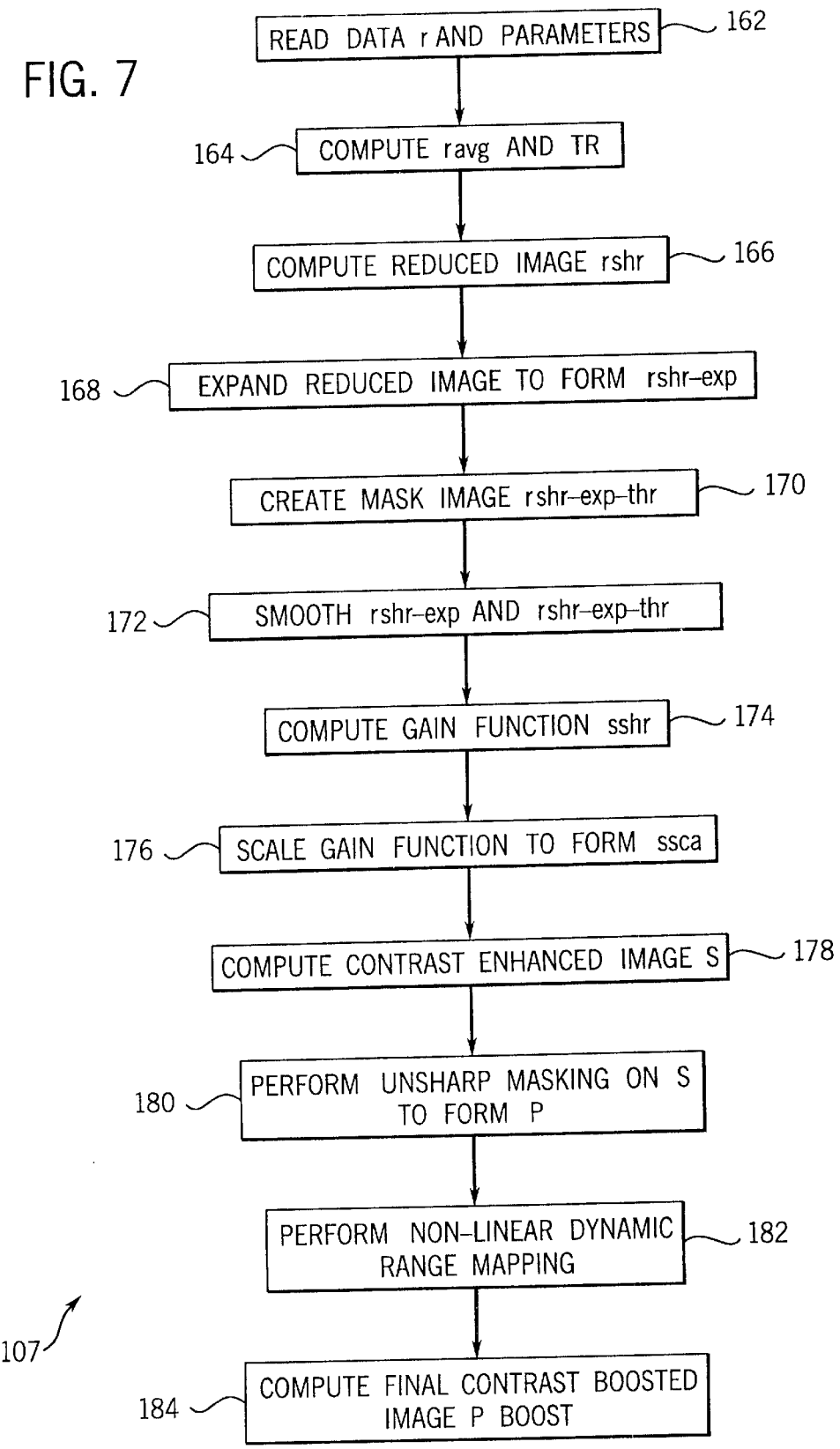
FIG. 7 is a flow chart illustrating exemplary control logic for performing adaptive contrast boosting in the process of FIG. 4.
Figure 8:
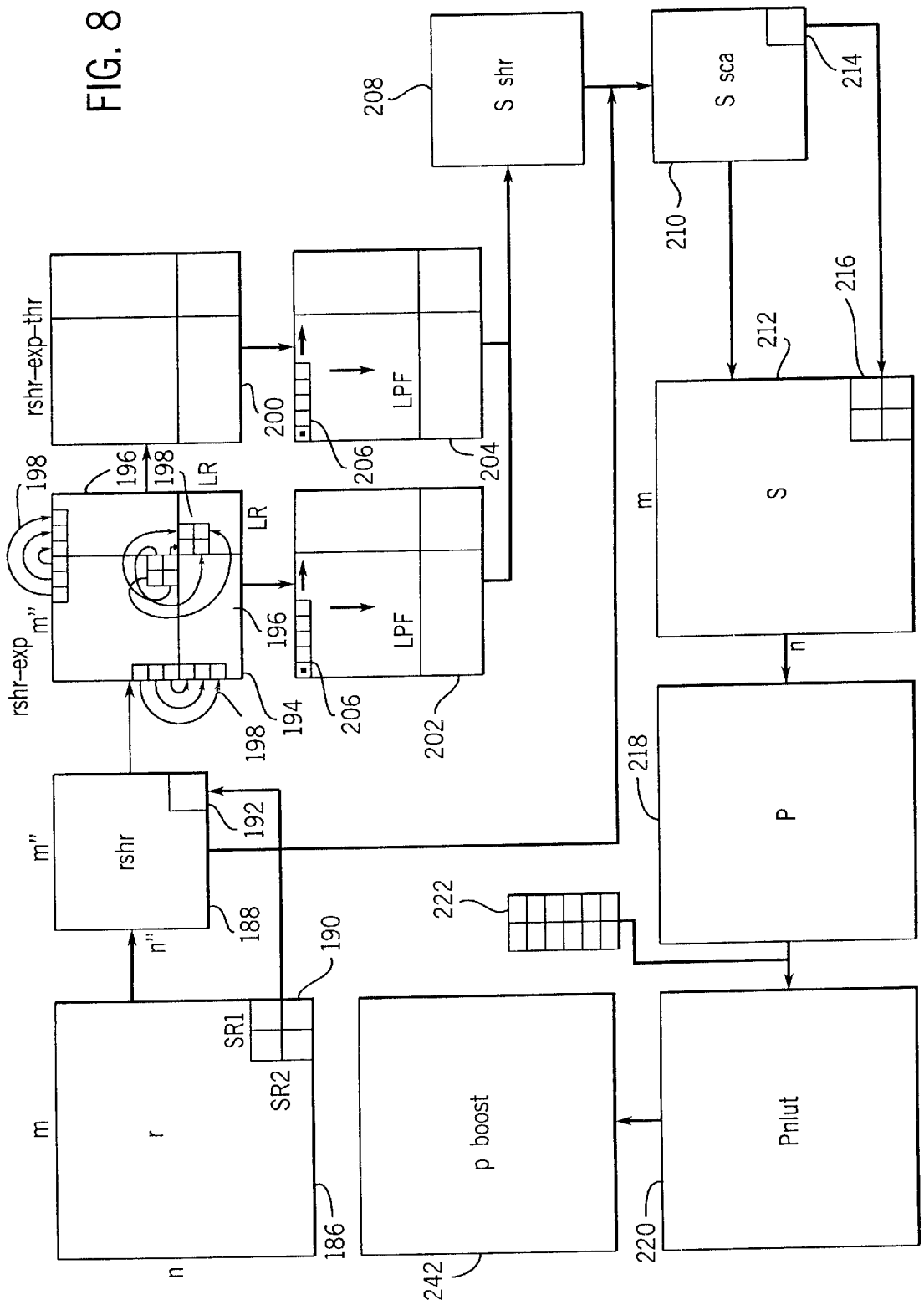
FIG. 8 is a diagrammatical representation of matrix transformation operations performed in the adaptive contrast boosting steps of FIG. 7.

FIG. 7 summarizes exemplary control logic for carrying out the adaptive contrast boosting step 107 of FIG. 4. Referring to FIG. 7, and to the diagrammatical representation of these steps in FIG. 8, as a first step 162, data of a matrix r is read, as well as parameters referred to below through the adaptive contrast boosting steps. In the presently preferred embodiment, the data of the matrix r, designated by reference numeral 186 in FIG. 8, is identical to the final equalized image data for matrix f illustrated diagrammatically in FIG. 6. From this image, an average value $r_{avg}$ is computed, along with a threshold value TR, as indicated at step 164. As in the adaptive equalization steps, the average value $r_{avg}$ is the average of all of the values of the matrix r, while the value TR is the product of this average value and a fraction tr which is input by the operator or may be set by the program, typically greater than 0, and in the present embodiment is set to a value of 0.1.

At step 166 of FIG. 7, a reduced image matrix rshr is computed as indicated by reference numeral 188 in FIG. 8. The matrix rshr has dimensions m"×n" as determined by averaging of pixels in non-overlapping neighborhoods of dimensions SR1×SR2, indicated by reference numeral 190 in FIG. 8. These non-overlapping neighborhood pixels are then converted to single pixels 192 in the rshr matrix.

At step 168, the reduced image is expanded to form a matrix rshr-exp, as designated by reference numeral 194 in FIG. 8. As described above with respect to the adaptive equalization process, this step is performed by expanding the dimensions of the matrix rshr by portions of dimension LR, indicated by reference numeral 196 in FIG. 8. In a presently preferred embodiment, the parameter LR is set to a value of between 3 and 41. As explained above, the expansion process provides pixel values in the expanded regions which are mirrored from the original matrix, as indicated at reference numeral 198 in FIG. 8.

At step 170 of FIG. 7, a masked image rshr-exp-thr is created by application of the following relations:

rshr-exp-thr=CR1*$r_{avg}$,
   if rshr-exp>TR; AND
rshr-exp-thr=0
   if rshr-exp≦TR where CR1 is a fixed constant, set to a value of 0.01 in the preferred embodiment.

Returning to FIG. 7, as indicated at step 172, the resulting matrices 194 and 200 are next smoothed by a low pass filtering operation. As illustrated in FIG. 8, this operation proceeds by application of a separable box-car filter on the matrices rshr-exp and rshr-exp-thr to produce resulting matrices 202 and 204, respectively. The box-car filter has dimensions LR, and proceeds through the rows and columns as described above in the adaptive equalization process.

At step 174, a gain function sshr is computed based upon both of the low pass filtered matrices. In particular, in the presently preferred embodiment, the matrix sshr, designated 208 in FIG. 8, is generated in accordance with the expression:

sshr=max(lpf-rshr-exp, NR1)/ max(lpf-rshr-exp-thr, NR1), where max(a, b) returns the maximum values of a and b, and NR1 is a constant internal parameter set between 0 and 1. In a presently preferred embodiment, the value of NR1 is set to a value of 0.0001.

Returning to FIG. 7, as indicated at step 176, the gain function is next scaled to form a matrix ssca, designated 210 in FIG. 8. This scaling function is preferably performed in accordance with the relation:

ssca=ssch*avg(lpf-rshr-exp)/avg(sshr), where the values avg are the average values of the indicated matrices.

At step 178 illustrated in FIG. 7, a contrast enhanced image s is next computed by linear interpolation of the scaled gain function. As illustrated in FIG. 8, the matrix s, which has dimensions m×n, and is designated by reference numeral 212 in FIG. 8, is populated with pixels in neighborhoods 216 derived from each pixel to 14 of the matrix ssca.

At step 180, a mid-frequency boosted image p is created by unsharp masking of the matrix s. This step is preferably performed in accordance with the relation:

$p(x, y)=NR2*s(x, y)+(1-NR2)*(r(x, y)-s(x, y))$, where the value NR2 is a user supplied parameter such that NR2>1.

From the mid-frequency boosted image p, designated by reference numeral 218 in FIG. 8, a non-linear dynamic range mapping function is applied to map the dynamic range of matrix p on to a desired dynamic range of a softcopy display device, as indicated at reference numeral 182 in FIG. 7. The non-linear mapping function expands local contrast within upper and lower regions of the dynamic range as summarized above with reference to FIG. 3. Based upon the values of matrix p, then, the function is applied, in the form of a lookup table 222 (see FIG. 8) to form a mapped matrix pnlut, designated by reference numeral 220 in FIG. 8.

Figure 9:
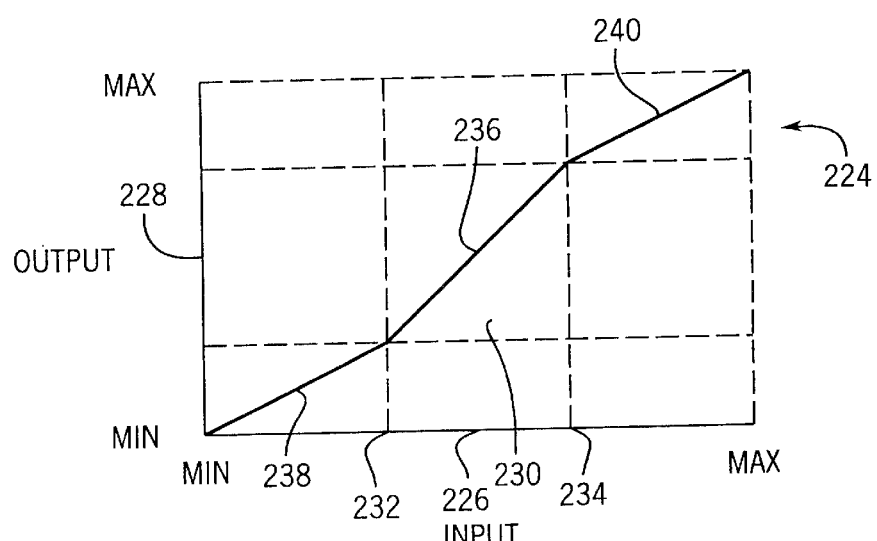
FIG. 9 is a graphical representation of non-linear dynamic range mapping transformations implemented in the control logic of FIG. 7.

In the presently preferred embodiment, the non-linear mapping function applied at step 182 serves to appropriately map upper and lower regions of the dynamic range of the softcopy display device, while providing different mapping for a mid region. An exemplary mapping relation is illustrated in FIG. 9. As shown in FIG. 9, the non-linear mapping function 224 may be expressed graphically as a relationship between input values along axis 226, and output values along axis 228. In a central region 230, between lower and upper bounds 232 and 234 of the central region, values of the input (i.e. of the matrix p) are mapped in accordance with the relationship identified by the segment of the function 236. Below the lower boundary of the mid region, a different mapping relationship 238 is applied to bring the lower intensity pixels within this region into the effective dynamic range of the softcopy display device. Similarly, in the upper region to the right of upper boundary 234 of the mid region, a different mapping function 240 is applied.

As will be appreciated by those skilled in the art, the use of the non-linear mapping function of the type illustrated in FIG. 9 permits the dynamic range of the image pixels to be conformed to the dynamic range of the softcopy display device. In specific applications, the imaging systems described above may support a wide variety of display devices, typically computer monitors, having different output dynamic ranges. In such cases, the mapping function applied at step 182 is preferably adapted for the dynamic range of each supported display device. In the image enhancement process described above, then, the dynamic range of the display device may be access, input, or otherwise recognized, and the mapping performed at step 182 adjusted to conform to the display device. Other display devices, of course, will receive different mapping functions adapted for their specific dynamic ranges.

To complete the adaptive contrast boosting operation, a final contrast boosted image pboost, designated by reference numeral 242 in FIG. 8, is generated from matrix pnlut by scaling in accordance with the following relation:

pboost$(x, y)$=pnlut$(x, y)*r_{avg}$/pnlunt$_{avg}$, where the "avg" values are the average values of the respective matrices.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for enhancing a discrete pixel image, the method comprising the steps of:
   (a) adaptively equalizing original intensity values for pixels comprising the image to reduce overall variations between high and low intensity regions; and
   (b) boosting local contrast between the intensity values by forming a mid-frequency boosted image and applying a non-linear mapping function to the mid-frequency boosted image to map low and high intensity pixel values to a desired dynamic range.

2. The method of claim 1, wherein step (a) includes steps of smoothing the intensity values for the pixels, generating a candidate equalized image based upon the smoothed values, and generating a final equalized image based upon pixel values of the candidate equalized image and the original intensity values.

3. The method of claim 2, wherein the step of generating the candidate equalized image includes steps of generating an equalization function, and generating the candidate equalized image based upon the equalization function and the original intensity values.

4. The method of claim 3, wherein for generation of the equalized image, values for individual pixels are selected from the candidate equalized image or from the original image values based upon a set of selection criteria.

5. The method of claim 4, wherein the original image values for individual pixels are selected for the equalized image when the candidate equalized image value for a pixel of interest is less than the original image value for the pixel.

6. The method of claim 1, wherein step (a) includes steps of shrinking the image, smoothing the image, generating an equalization function based upon the smoothed image, and expanding the equalization function by bilinear interpolation.

7. The method of claim 1, wherein step (b) includes steps of smoothing the image generated in step (a), generating a gain function based upon the smoothed image, and generating the mid-frequency boosted image based upon the gain function.

8. The method of claim 7, comprising the steps of scaling the gain function, expanding the scaled gain function, and unsharp masking the scaled gain function to generated the mid-frequency boosted image.

9. The method of claim 1, wherein the non-linear mapping function maps upper and lower range intensity values of the mid-frequency boosted image to upper and lower ranges of the desired dynamic range, and maps intermediate intensity values of the mid-frequency image substantially unchanged.

10. The method of claim 9, wherein the non-linear mapping function maps the upper and lower range intensity values linearly within the respective upper and lower ranges.

11. The method of claim 1, wherein the non-linear mapping function is selected from a plurality of candidate mapping functions based upon a dynamic range of a display device.

12. A method for enhancing a discrete pixel image for softcopy display, the method comprising the steps of:
   (a) adaptively equalizing original intensity values for pixels comprising the image to reduce overall variations between high and low intensity regions;
   (b) boosting local contrast between the intensity values by forming a mid-frequency boosted image; and
   (c) applying a non-linear mapping function for a softcopy display device to the mid-frequency boosted image to map the intensity values to a dynamic range of the softcopy display device.

13. The method of claim 12, wherein the non-linear mapping function maps upper and lower range intensity values of the mid-frequency boosted image to upper and lower ranges of the softcopy device dynamic range, and maps intermediate intensity values of the mid-frequency image substantially unchanged.

14. The method of claim 13, wherein the non-linear mapping function maps the upper and lower range intensity values linearly within the respective upper and lower ranges.

15. The method of claim 12, wherein the non-linear mapping function is selected from a plurality of candidate mapping functions based upon the dynamic range of the softcopy display device.

16. A method for enhancing a discrete pixel image, the method comprising the steps of:
   (a) preprocessing image data to shrink an original image by a desired factor;
   (b) adaptively equalizing original intensity values for pixels comprising the image to reduce overall variations between high and low intensity regions;
   (c) boosting local contrast between the intensity values by forming a mid-frequency boosted image and applying a non-linear mapping function to the mid-frequency boosted image to map low and high intensity pixel values to a desired dynamic range; and
   (d) postprocessing the mapped intensity values from step (c) for a softcopy display.

17. The method of claim 16, wherein the desired factor applied at step (a) is 1.

18. The method of claim 16, wherein the postprocessing step includes window leveling the mapped intensity values.

19. A system for enhancing and viewing discrete pixel images, the system comprising:
   a memory device for storing image data representative of discrete pixel values of a reconstructed image;
   a softcopy display station for displaying an enhanced image based upon the image data, the display station having a predetermined dynamic range; and
   a data processing circuit configured to perform adaptive equalization of the discrete pixel values of the image data, and to enhance local contrast of the equalized values to adapt the image data to the dynamic range of the display station.

20. The system of claim 19, wherein the data processing circuit is configured to generate a mid-frequency boosted image based upon the equalized values, and to non-linearly map the mid-frequency boosted image to the dynamic range of the display station.

21. The system of claim 20, wherein the non-linear mapping performed by the data processing circuit maps upper and lower range intensity values of the mid-frequency boosted image to upper and lower ranges of the dynamic range, and maps intermediate intensity values of the mid-frequency image substantially unchanged.

22. The system of claim 21, wherein the non-linear mapping maps the upper and lower range intensity values linearly within the respective upper and lower ranges.

23. The system of claim 20, wherein the non-linear mapping is based upon a mapping function selected from a plurality of candidate mapping functions based upon the dynamic range of the softcopy display station.

24. A computer program for enhancing a discrete pixel image, the program comprising:
   a machine readable medium for storing machine readable configuration code; and
   configuration code stored on the machine readable medium, the code comprising instructions for adaptively equalizing original intensity values for pixels comprising an image to reduce overall variations between high and low intensity regions, boosting local contrast between the intensity values by forming a mid-frequency boosted image, and applying a non-linear mapping function for a softcopy display device to the mid-frequency boosted image to map the intensity values to a dynamic range of the softcopy display device.

25. The computer program of claim 24, wherein the code includes instructions for determining the dynamic range of the softcopy display device.

26. The computer program of claim 25, wherein the non-linear mapping function is selected from a plurality of candidate mapping functions based upon the dynamic range of the softcopy display device.

* * * * *